Feb. 22, 1938.  R. P. LEWIS  2,108,969
AUTOMATIC CLUTCH MECHANISM
Filed Aug. 2, 1933  2 Sheets-Sheet 1
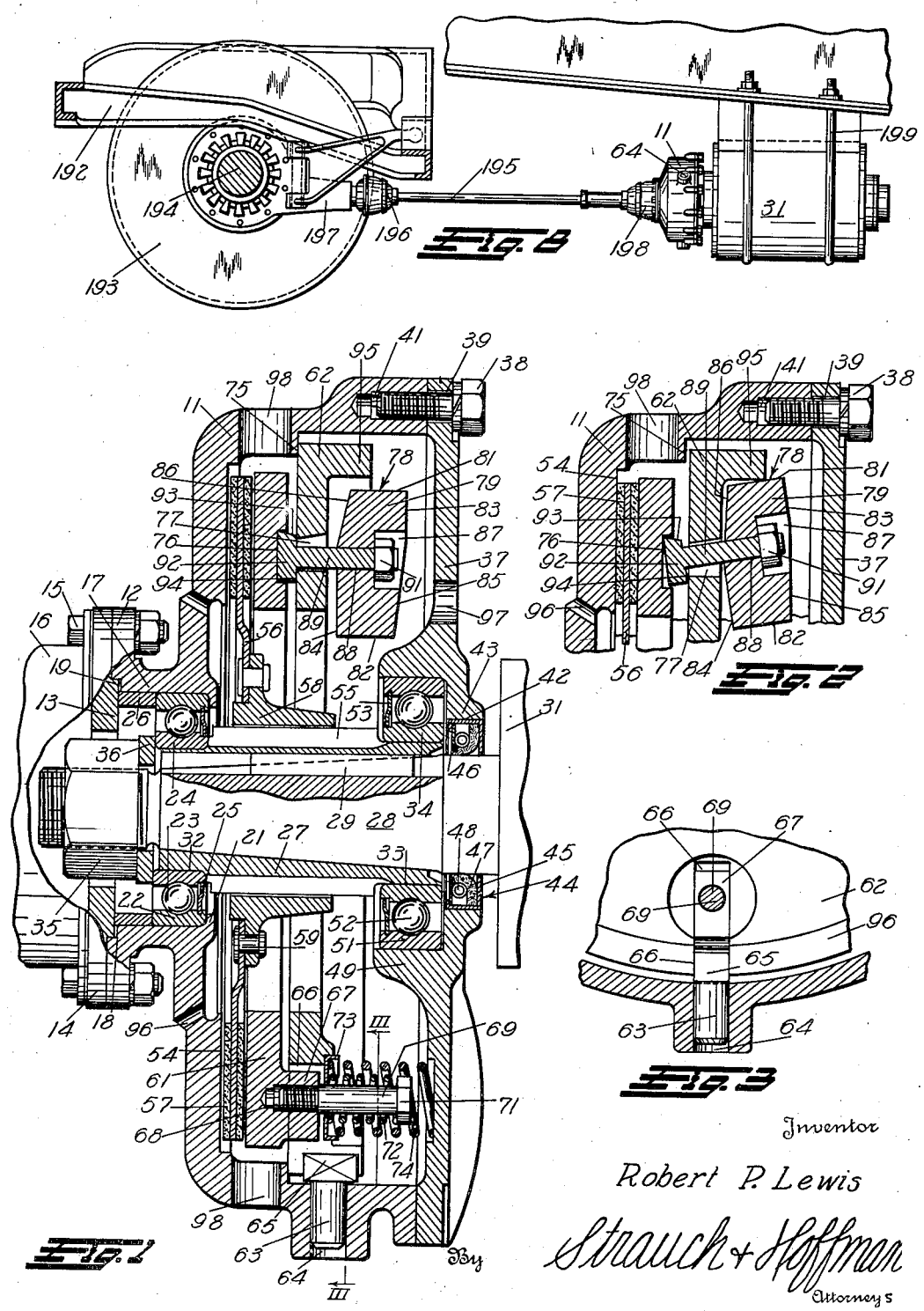
Inventor
Robert P. Lewis
Strauch + Hoffman
Attorneys

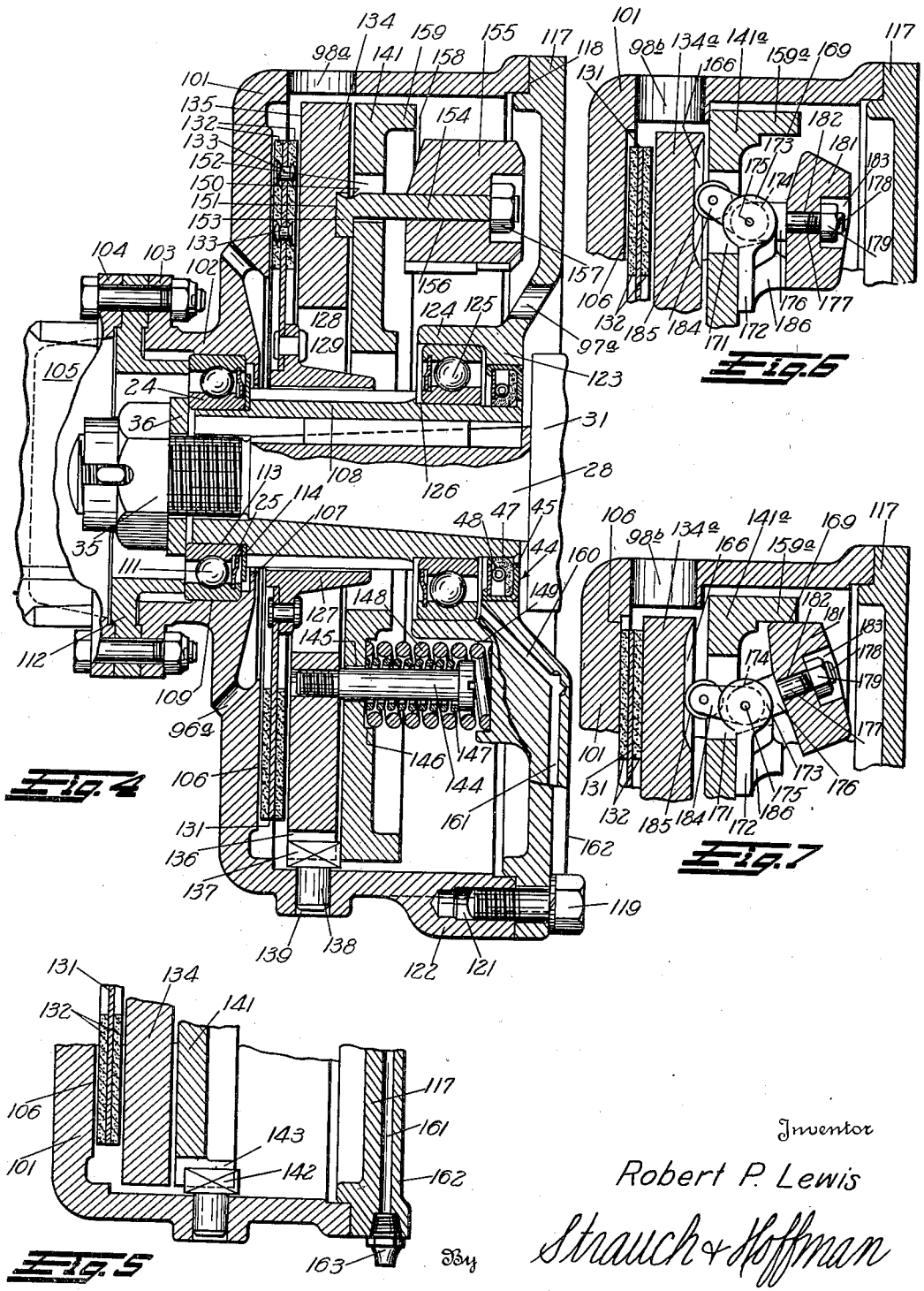

Patented Feb. 22, 1938

2,108,969

UNITED STATES PATENT OFFICE 2,108,969

AUTOMATIC CLUTCH MECHANISM

Robert P. Lewis, Toledo, Ohio, assignor to Automatic Drive & Transmission Company, Gloucester City, N. J., a corporation of New Jersey Application August 2, 1933, Serial No. 683,383

5 Claims. (Cl. 192—105)

This invention relates to improved clutch and transmission mechanisms, more particularly of the self-operating or automatic type and particularly adapted for use in connection with the driving mechanisms for generators, compressors and the like as are employed on refrigerator cars, Pullman cars and other rail vehicles.

The present invention comprises improvements in automatic or self-operating clutches of the type disclosed in copending application Serial Number 606,238, filed April 19, 1932, by Wade D. Morton and William E. Haupt in that among other features it provides a more compact and self-contained clutch particularly adapted for the uses above stated.

In the type of drives as employed in connection with compressors, generators, refrigerating machinery and the like for Pullman cars, refrigerator cars, trucks and the like, the unit to be driven is usually connected to a source of power such as a wheel or axle of the vehicle in such a manner that the drive is direct and the driven element starts, stops and runs at the same relative speed as the driving element. This is particularly undesirable in railway cars since it imposes an additional load upon the tractive unit before a period has elapsed in which a sufficient degree of speed or momentum of the driving element has been acquired to meet the initial load. This is particularly true of long trains containing cars of the refrigerator type and passenger trains of recent development wherein mechanical means are associated with the individual cars to effect air-conditioning thereof. With a clutch of the type described herein, which is of the automatic or self-operating type, interposed between the driving mechanism and the driven unit, a driving connection is not established therebetween until the vehicle has reached a substantial predetermined speed and attained the desired momentum. When the latter condition is reached the load of the generator or like unit is smoothly imposed upon the axle or other source of power. This arrangement minimizes the effect of the initial load while yet insuring a smooth direct drive at the higher speeds.

The clutch of the present invention is also particularly adaptable for us in connection with automatic vehicles wherein it is desirable that the engine be permitted to attain a predetermined relatively high torque delivery speed before a power transmitting drive is established between the engine and the transmission and differential assembly in order that the engine develop sufficient power to adequately handle the relatively heavy initial or starting load.

The clutch mechanism of the present invention, when embodied in larger sizes, may be advantageously employed in rail car drives, and be interposed between the prime mover and the vehicle drive mechanism. An internal combustion engine of the Diesel or other types may be utilized as the prime mover and the vehicle drive mechanism may or may not embody two or more gear reductions, depending upon the character of the vehicle and type of service to which it is to be put, although it is contemplated, that for normal power transmitting operations, the drive be direct, i. e., no gear reduction other than that normally used in the vehicle drive mechanism be used, by reason of the fact that the clutch mechanisms of the present invention establish a slipping power transmitting connection between the prime mover and the load and allow the former to develop sufficient power to handle relatively great starting loads and the like.

Accordingly, it is a primary object of the present invention to provide an improved clutch mechanism of the automatic or self-operating type which is compact and self-contained and particularly adapted for drives in connection with various types of units on railway or like vehicles.

A further object of the present invention is the provision of an improved automatic clutch mechanism which is particularly adaptable for connecting a driving unit and a driven unit, all of the working parts thereof being relatively compact and contained within the clutch mechanism whereby a minimum exposure of parts to dirt and dust is obtained.

A further object of this invention is to provide an improved type of automatic clutch mechanism which is designed to be simply connected to a driving element and adapted to rotatably support the connecting mechanism of a driven element, all connections being contained within the clutch whereby a minimum of parts may be utilized.

It is still a further object of this invention to provide an automatic clutch mechanism of an improved type wherein an enclosed container is provided for both the driving and the driven elements, the container serving also as a support for rotatably supporting one of said elements whereby a compact and simple construction is provided.

A further object of this invention resides in the provision of an improved type of automatic clutch mechanism wherein the driven and driving elements are supported by the mechanism for relative movement therebetween in anti-friction means contained within the mechanism.

A further object of this invention is to devise an improved form of power transmitting device of the speed responsive type comprising an enclosure therefor and means internal with the enclosure and compactly arranged for limiting the movement of the speed responsive means.

Still another object of this invention is to provide an improved form of automatic clutch mechanism of the speed responsive type and containing driving and driven elements, the mechanism being designed to limit the movement of the speed responsive elements beyond an amount sufficient to engage and disengage the driving and driven elements.

A further object of this invention resides in the provision of a novel type of automatic clutch mechanism embodying driving and driven elements and an assembly for effecting engagement and disengagement thereof, with combined means for locking one of the elements against relative rotation and for limiting the axial movement of the assembly.

A still further object of this invention is to provide an improved type of automatic clutch mechanism embodying a casing and a cover therefor with means contained in the casing and cover for attachment to and support of the connecting driving and driven assemblies whereby a closely compact and low cost mechanism is provided.

With the above and other objects in view as will become apparent from the following description and the appended claims, reference is made to the accompanying drawings in which:

Figure 1 is a longitudinal sectional view of a preferred type of automatic clutch mechanism embodying the principles of this invention;

Figure 2 is a fragmental sectional view of the upper portion of the clutch shown in Figure 1, illustrating the weight there shown in its limiting position against its stop, and with the clutch plates engaged;

Figure 3 is a fragmental view, in partial section, of one of the driving lugs or key assemblies employed in the clutch of Figure 1 taken on the line III—III of Figure 1, looking in the direction of the arrows;

Figure 4 is a longitudinal sectional view of a further preferred embodiment of an automatic clutch mechanism embodying the principles of this invention;

Figure 5 is a fragmentary longitudinal section of a portion of the automatic clutch mechanism illustrated in Figure 4, and shows one of the driving key assemblies associated with the reaction plate;

Figure 6 is a fragmentary longitudinal section of a portion of an automatic clutch mechanism illustrating a further preferred modification of a weight in a position with the clutch plates disengaged;

Figure 7 is a view similar to that of Figure 6 with the weight shown in limiting position against its stop with the clutch plates engaged; and Figure 8 is a side view illustrating a portion of a railway car or like vehicle and shows one of the many possible modes of employing the automatic clutch mechanism of this invention in transmitting power from the wheels and axle to any desired unit such as a generator or the like.

With reference to the above figures, wherein corresponding numerals have been employed to indicate corresponding portions throughout, and with particular reference to Figure 1, 11 designates a casing or clutch housing of general cup shape with an entire end open as shown at the right of the view. A relatively small opening is formed at the left end of casing 11 and is defined by a flange 12. Adjacent flange 12 is mounted one end of a driving member 13 connected to a suitable source of power through a suitable connection such as a universal joint 16 and having a flange 14 thereon arranged to register with flange 12. Flanges 12 and 14 are connected to rotate together by suitable bolt and nut assemblies 15 or other fastening means passing through registering holes in the flanges (not shown). Flange 12 is provided with a relatively long neck or constricted portion 17 which at its outer terminus 18 is formed with a concentric notch to accommodate a centering projecting flange 19 on driving member 13. Flange 12 is provided on its inner terminus with a concentric flange 21 which serves as one positioning member for a bearing assembly, now to be described.

Closely fitting with neck 17 and abutting flange 21 is an outer bearing race 22 in which are mounted suitable antifriction elements such as ball bearings 23 riding on an inner race 24. Suitable means is provided for preventing escape of lubricant from the bearing to the clutch such as a lubricant retaining ring 25 secured in fluid tight relation in a groove formed in outer race 22. The inner periphery of ring 25 only fits in proximate relation to inner race 24 to avoid rubbing friction, and it prevents the leakage of lubricant forced against the outer race through the action of centrifugal force.

A second spacer or positioning member for the bearing assembly, comprising a ring 26, is mounted within neck 17, and is adapted to be gripped between the adjacent face of flange 14 and the adjacent face of race 22 when bolt and nut assemblies 15 are tightened, thereby securely holding the bearing assembly in place.

Inner race 24 is adapted to rotatably support one end of an exteriorly splined sleeve 27 suitably connected to a driven shaft 28 as by a key and slot assembly as shown at 29 or other similar means. Shaft 28 may in turn be connected to any suitable unit such as indicated at 31 to effect a drive thereof. In the present instance driven unit 31 comprises a generator or compressor or like unit and shaft 28 is rotatably supported therein in bearings (not shown). Sleeve 27 is formed at its outer periphery adjacent one end with a recess 32 of a shape to accommodate race 24 and is provided at its opposite end with a recess 33 positioned to receive an inner race 34 of a second bearing assembly to be described.

Sleeve 27 has a tapered interior and receives a correspondingly tapered end of shaft 28, the end of shaft 28 opposite from unit 31 being reduced in size and threaded to receive a nut 35 in conjunction with a washer 36, the latter cooperating with recess 32 to receive bearing race 24. It will thus be observed that by reason of the tapered fit of shaft 28 within tube 27, the connection of nut 35 therewith and the key assembly 29, shaft 28 is effectively secured to tube 27 to rotate therewith and be driven thereby.

A cover plate 27 is provided on the end of casing 11 opposite from flange 12 which is of the same general shape as the cross section of casing 11 and is arranged to be secured thereto by suitable cap screws 38 projecting through bolts 39 in plate 37 registering with threaded bolts 41 formed in casing 11. Plate 37 is provided with an opening 42 at its center which is surrounded by an enlarged portion or flange 43 adapted to receive and support a combined sealing and lubricant container forming assembly 44. Assembly 44 is preferably formed of thin metal members 45 and 46 disposed to overlap as shown and provide a container with one side open to shaft 28. A lubricant retainer 47 of suitable material such as raw hide or the like, is secured therein and is held in sealing engagement with shaft 28 at all times by a resilient member such as coiled tension spring 48. The sealing assembly just described is designed primarily to prevent lubricant contained in the bearing assembly from leaking out of the mechanism, but it is also effective to prevent the ingress of dirt and other extraneous matter into the mechanism.

Cover plate 37 is further formed with an interiorly extending concentric flange 49 arranged to support an outer race 51 of the second bearing assembly. Suitable anti-friction members such as ball bearings 52 are provided between races 34 and 51, the escape of lubricant from the bearing being prevented by a suitable lubricant retaining ring 53 similar to ring 25 of the bearing assembly, previously described.

With reference to the engaging and disengaging elements of the clutch mechanism, an interior face of casing 11 is finished as indicated at 54, and serves as a driving surface for the clutch mechanism. Adjacent driving face 54, and mounted on and to rotate with sleeve 27, is a driven member or clutch plate 56 preferably formed of thin sheet metal or like material and provided immediately adjacent face 54 with concentric rings 57 of suitable friction material such as fabric, leather or of the composition disclosed in copending application Serial No. 631,084 filed August 30, 1932. Plate 56 is secured to a hub member 58 by rivets 59, the hub member being splined on its interior to engage splines 55 of sleeve 27, thereby providing means for transmitting power from plate 56 to shaft 28. If desired, vibration dampeners of any desired type may be employed in combination with driven plate 56.

Adjacent the face of ring 57, away from face 54, is a driving plate 61 arranged to be moved in a direction parallel to the axis of shaft 28 in a manner to be presently described, and in so doing effect engagement and disengagement of the clutch mechanism. Adjacent driving plate 61, a reaction member or plate 62 is positioned which is designed for movement in a direction parallel to the axis of shaft 28. Both reaction plate 62 and driving plate 61 are secured against rotation relative to casing 11 by driving keys or studs 63 positioned at preferably 120° intervals around the periphery of casing 11 in openings 64.

Studs 63 are provided with driving heads 65 which are received in, and disposed in driving engagement with the walls of slots 66 provided in reaction plate 62 and are adapted to prevent rotation of the latter relative to casing 11. Driving plate 61 is formed with a plurality of axially extending lugs 67, corresponding in number and position to notches 66 in reaction plate 62. Lugs 67 engage with the walls of notches 66 and prevent rotation of reaction plate 62 relative to driving plate 61. It will be observed that the keying mechanism just described establishes a driving connection between plates 61 and 62 and casing 11, and yet permits the plates to undergo axial movement with respect to each other and casing 11. The clearance between heads 65 and recesses 66 is preferably sufficient to allow reaction plate 62 to undergo slight tilting movements for a purpose that will presently appear.

Lugs 67 in driving plate 61 are bored and tapped as indicated at 68 to receive studs 69 which are provided with enlarged ends or heads 71. Each stud 69 is encircled by a coil spring 72 of a diameter slightly greater than that of the stud. Springs 72 abut washers 73 provided to engage reaction plate 62 across notches 66. Springs 72 act against heads 71 and react against plate 62 and thereby operate to urge plates 61 and 62 together and disengage the clutch mechanism in a manner presently to be described and they will be hereinafter termed holdback springs. The holdback assemblies are also encircled by compression springs 74 whose ends are received in suitable recesses formed in the interior face of cover plate 37. Springs 74 urge the driving and reaction plate assembly to the left toward the driven member, and although in the present embodiment of my invention, the preferred number of such spring assemblies is three, it is to be understood that the number thereof may readily be varied and it is not intended to restrict the exact number that may be used.

As just explained, the driving and reaction plate assembly is urged to the left toward the driven member by springs 74, and in order to prevent the latter from bringing the driving and driven plates into engagement when the prime mover is operating below a predetermined speed, I preferably provide a shoulder 75 in casing 11, which is adapted to limit movement of the reaction plate to the left by engagement therewith. Although I have illustrated one particular form of means for exerting a movement limiting action on plate 61, it is to be understood that any other suitable means may be employed for effecting this result without departing from the spirit of the present invention. For instance, bolts may be adjustably threaded into plate 61 and extend through apertures in cover 37, or studs may be employed and nuts adjustably associated therewith in order to compensate for wear of the friction facings.

With reference to the speed responsive means for effecting engagement and disengagement of the clutch mechanism, any suitable speed responsive mechanism may be utilized, but in the present embodiment of my invention it comprises centrifugally operable mechanism. To this end, plate 61 is provided, on the face opposite to that cooperating with driven plate 56, with a series of recesses, one of which is indicated at 76. Recesses 76 are preferably rectangular in shape with the longer dimension of the rectangle running as a portion of a chord across driving plate 61. Recesses 76 are of like number and correspond in position to a series of apertures 77 of general rectangular shape formed in reaction plate 62. While on the opposite faces of plate 62, apertures 77 are rectangular in shape, it will be observed that the rectangles are of different size and the sides of the apertures nearest the periphery of plate 62 are inclined with respect to the opposite sides of the apertures and hence afford a bevelled surface, the purpose of which will be hereinafter described.

A series of speed responsive elements 78 or weights with levers affixed thereto are provided in apertures 77 of plate 62. Each element 78 comprises a weight 79 of the hexagonal shape illustrated with opposite parallel faces 81 and 82 substantially equal in length. Opposite sides 83 and 84 are parallel but of unequal length and opposite sides 85 and 86 are not only of different lengths but are not parallel. Weights 79 are formed with a pair of recesses 87 and a pair of apertures 88 extending from the bottom of recesses 87 to side 84. A lever 89 having a pair of reduced portions is positioned within apertures 88, and is secured to weight 79 by a pair of nuts 91 engaging threads formed on the reduced portions of lever 89, or by other suitable fastening means.

At the opposite end of lever 89 and preferably formed integral therewith, is a head 92 of substantially the same size and shape as recess 76 with the exception of the face nearest the periphery of plate 61, which is preferably bevelled as shown at 93. Head 92 is of somewhat greater depth than recess 76 and projects therefrom a substantial amount to space plates 61 and 62 apart against the action of springs 72.

With the driving member rotating below the engaging speed of the clutch, the parts assume the positions shown in Figure 1 and with the parts so disposed, the operation of this preferred embodiment of the clutch of my invention in response to acceleration of the driving member, will now be described. The direction of power transmission is normally from flange 14 to unit 31 but it is to be understood that it may, in some cases, be in the opposite direction. In the position shown in Figure 1, the various elements are in idling position wherein no power is being transmitted. It will be observed that driven plate 56 is free from contact with driving face 54 of casing 11 and the driven face of driving plate 61, plate 61 being held back against contact with driven plate 56 by springs 72 acting against reaction plate 62, which in turn is held in the position shown in Figure 1 by reason of engagement of its peripheral edge with shoulder 75 of casing 11. Shaft 28 and casing 11 are thus free to rotate relatively to one another.

Casing 11 is rotated from a suitable source of power and as the speed of rotation increases above a predetermined idling speed, centrifugal force acts upon weights 79 and causes them to rock outwardly toward the periphery of casing 11. As they rock, levers 89 are carried therewith and heads 92 tilt and are partially removed from their position in recesses 76. Levers 89 rock about the edges of faces 93 which are seated in the outermost corners of recesses 76, and in so doing, the rear faces of heads 92 react against the contacting faces of reaction plate 62 through reaction faces or edges 94 formed on heads 92. This movement of heads 92 causes driving plate 61 and reaction plate 62 to separate against the action of springs 72, and results in driven member 56 being frictionally gripped between plate 61 and surface 54 of casing 11. When the driven member has been frictionally gripped in the manner just described, movement of plate 61 under the influence of weights 78 is substantially arrested, and further outward rocking movement of weights 78, in response to a further increase of speed of the driving member, causes reaction plate 62 to move to the right out of engagement with shoulder 75, against the action of springs 74. Upon initiation of this operation, a torque of low and slowly increasing magnitude is transmitted from the driving to the driven plates, and as the operation proceeds, in response to continued acceleration of the driving member, pressure is built up in springs 74 and between the surfaces of the plates. As the speed increases, the plate pressure increases. This proportional increase is desirable since it affords means by which slippage of the clutch may occur at the lower speeds when the power connection is first being established and the prime mover is initially picking up the load, thus avoiding any jerky engagement which may prove injurious to the clutch or the unit being driven.

As the engaging operation is proceeding, and reaction plate moves to the right and builds up pressure in springs 74, it is apparent that should the weights 78 move unevenly, or irregularly, and tend to apply a greater force to one or more localized portions of plate 61, plate 62 may tilt or rock slightly and tend to compensate for such action and thereby insure the application of substantially uniformly distributed forces to plate 61.

Continued increase in the speed of rotation of casing 11 causes weights 78 to swing outwardly to a greater extent and increase the pressure between the driving and driven elements until weight elements 79 contact with a flange 95 preferably integrally formed with reaction plate 62. Flange 95 prevents further movement of weights 79 and insures the maintenance of a constant pressure between the contacting elements at all higher speeds of rotation. The relation of the parts under these conditions is illustrated in Figure 2. The action of weights 78 and their levers 89 is in the nature of a toggle or wedge-like action.

As the speed of rotation of casing 11 decreases, the action of the clutch will be just the reverse of that described above. Springs 72 force plates 61 and 62 together and bring weights 78 into their inner or disengaged positions and springs 74 force plate 62 against shoulder 75 against action of the decreasing centrifugal force tending to force weights 78 outwardly. As plates 61 and 62 come together, pressure between the driving and driven elements is released and an idling phase is again established.

In order to cool the clutch parts while the mechanism is slipping and picking up the load, and remove any particles that may be freed from facings 57 as the result of wear thereof, I provide casing 11 and cover 37 with air inlet apertures 96 and 97 respectively, and casing 11 is provided with exhaust ports 98. Air currents, induced by rotation of the clutch parts, enter apertures 96 and 97, flow over the surfaces of the parts and are exhausted through ports 98. The greater part of the heat is generated in plate 61 and that portion of casing 11 adjacent surface 54, and as springs 72 and 74 bear against plate 62, they are substantially thermally isolated, and there is accordingly no possibility of drawing or harmfully modifying their temper.

Figures 4 and 5 illustrate a clutch construction embodying a further preferred embodiment of my invention. Since certain parts thereof, such as the keyed shaft construction and the connection of the driven shaft to the driven unit are the same, description thereof will not be repeated. An open-ended casing 101 is provided with the closed end thereof having an aperture therein defined by a neck portion 102 terminating in a flange 103, suitably apertured to receive connecting bolts from a like flange 104 of a driving element 105. Casing 101 is formed on its inner face with a driving face 106 and an inner peripheral flange 107 adapted to surround a splined sleeve 108 in spaced relation thereto. A suitable recess 109 is formed in neck portion 102 to accommodate the outer race of a bearing 111 of the same general type hitherto described, bearing 111 being held in place by a flanged collar 112 having a flange thereon which is adapted to be engaged and clamped between flanges 103 and 104. It will thus be seen that bearing 111 is rigidly held in position by flanged collar 112 and flange 107. Tube 108 is provided with a corresponding recess adjacent its end to accommodate the inner race of bearing 111, the race being maintained in position in the recess by a washer 36 abutting the opposite end thereof, washer 36 being held in place by a nut 35 suitably threaded on the end of driven shaft 28.

In this form of my invention, a washer 114 is provided immediately between the inner race 24 of the bearing and the adjacent face of recess 113. Washer 114 acts as a baffle member to further insure against the escape of lubricant from the bearing into the interior of the mechanism and flange 107 formed on casing 101 has a like baffling action.

A cover plate 117, formed with an annular groove 18, is provided to engage and cover the open end of casing 101 and is suitably secured thereto by a series of circumferentially spaced cap screws 119, engaging threaded apertures 121 formed in bosses 122 suitably spaced around the periphery of casing 101. A central aperture is formed in cover plate 117, defined by a flange 123, and contains a sealing member similar to that described in connection with the embodiment shown in Figure 1. An interiorly extending flange 124 is also provided on cover plate 117 which serves to contain a bearing 125 of the general type hitherto described. The inner race of bearing 125 is mounted in a circumferential recess 126 formed in splined sleeve 108. It will be noted that the novel bearing construction in connection with the means for supporting the bearings including casing 101 and cover plate 117, constitute an exceedingly strong and satisfactory construction to combat any thrust that may be developed between the clutch mechanism and shaft 28 thereby avoiding any effect of such a thrust action upon the actual engaging and disengaging elements whereby their automatic action is not hampered and undue stress and wear are not imposed thereon.

A hub 127 is splined to sleeve 108 and is formed with a concentric flange 128 provided with holes therein to accommodate a suitable fastening means such as rivets 129 for securing a driven clutch plate 131 thereto. Clutch plate 131 may be of any preferred form and may be designed to include a vibration dampener such as is disclosed in my copending application, Serial No. 672,364, if desired. Clutch facings 132 are provided adjacent the periphery of clutch plate 131 and are suitably secured thereto as by rivets 133. A driving plate 134 is positioned adjacent clutch face 132 opposite from that facing driving face 106 and is provided with a driving face 135 positioned to engage adjacent clutch facing 132. Plate 134 is formed with recesses 136 in its periphery which are disposed to engage driving key 137 formed on studs 138 suitably secured in holes 139 formed in the periphery of casing 101.

Key assemblies 138 are preferably symmetrically arranged at 120° intervals about the periphery of plate 134, and establish a driving connection between casing 101 and plate 134. In this form of the invention, keys or lugs 138 also perform the function of limiting movement of reaction plate 141 to the left, and in Figure 4 they are shown as being engaged thereby. Referring more particularly to Figure 5 of the drawings, driving lug or key assemblies 142 fitting in apertures in casing 101, are arranged at 120° intervals about the periphery of the reaction plate intermediate the driving plate key assemblies, and are disposed in engagement with the walls of recesses 143 formed in plate 141, and serve to couple the latter to casing 101.

A plurality of studs 144 extend through and may be slidably associated with apertures 145 formed in plate 141, and are threaded into driving plate 134. Recessed portions 146 are formed in plate 141 adjacent apertures 145, each recess serving to accommodate the ends of two springs 147 and 148. Spring 147 is of relatively small diameter and acts against the head of stud 144, while spring 148 is of larger diameter than the head of stud 144 and acts against plate 141 and reacts against the bottom of a recess 149 formed in cover plate 117. While the number of spring assemblies as described above may be varied as desired, six are preferably employed in the present mechanism. It will be noted in connection with studs 144 that by reason of driving plate 134 being keyed to rotate with casing 101 through key 137, reaction plate 141 likewise may be caused to rotate with casing 101 due to the engagement of studs 144 with apertures 145, and key assemblies 142 may be accordingly omitted from the mechanism if desired.

A series of rectangular apertures 151 is formed in driving plate 134 adjacent reaction plate 141, the longitudinal dimensions of the notches lying parallel to chords across the face of the plate. Apertures 152 are formed in reaction plate 141 and correspond in number to notches 151. Apertures 152 are not positioned directly opposite notches 151 but are slightly offset outwardly toward the periphery of the plates. A head or fulcrum member 153 is provided in each of recesses 151 and substantially corresponds thereto in size with the exception of the outer side thereof, which is formed with a concave face 150 for a purpose later to be described. Heads 153 are preferably integrally formed with levers 154 to which are secured weight elements 155. Levers 154 extend through apertures 156 in weights 155 and are secured thereto as by nuts 157 secured upon threaded extremities thereof. Weights 155 may be of any shape desired but it is preferred to so form them as to provide a portion of one face 158 disposed at an angle to the adjacent face of reaction plate 141, and to allow free rocking movement thereof. Plate 141 is provided with a flange 159 against which weights 155 are adapted to abut when the clutch is fully engaged.

The method of operation of this embodiment of my clutch mechanism is much the same as that of the embodiment illustrated in Figure 1, the transmission of power being normally from member 105 to unit 31. In Figure 4, the elements are shown in idling position, and they are disposed in the positions they assume when the driving member is rotating at an insufficient speed to actuate the speed responsive means, clutch faces 132 being spaced from driving face 106 of casing 101 and driving plate 134.

As the speed of rotation of housing 101 increases, the speed of rotation of plates 134 and 141 is necessarily increased and weights 155 are caused to swing or rock toward the periphery of casing 101 by reason of centrifugal force. As the weights swing outwardly, the attached ends of levers 154 are carried therewith, the levers rotating about the innermost point of concave face 150 as a pivot. The opposite face of head 153 is forced outwardly against reaction plate 141 and plates 134 and 141 are caused to move apart in the manner previously described, and the plate pressure is built up and the driven parts are brought into synchronism in the manner described in connection with the device shown in Figure 1. The action of weights 155 and levers 154 is comparable to that of a toggle joint or wedge.

With reference to the speed responsive mechanism utilized in this form of the invention, concave faces 150 are provided on heads 153, so that when the latter fulcrum outwardly in response to centrifugal force, they will not contact the outer walls of recesses 151, thereby insuring fulcruming thereof in the outer corners of recesses 151 during all phases of operation. Apertures 152 are preferably of sufficient size so that when plates 134 and 141 are separated, by removing the spring assemblies, the weight assemblies may be received therethrough as a unit, thus avoiding the necessity for disassembling them.

With reference to the mode of supplying lubricant to the bearings of this mechanism, the front bearing is preferably lubricated from the universal joint associated therewith and the rear bearing is preferably supplied with lubricant through mechanism associated with cover 117, although it may be lubricated in any other desirable manner. Referring more particularly to Figures 4 and 5, cover 117 is provided with communicating passages 160 and 161, formed in a boss 162 preferably cast integrally with cover 117. Passage 160 communicates with the lubricant containing portion of bearing assembly 125. Passage 161 preferably extends to the outer periphery of cover 117 and has a lubricant fitting 163 of any well known form threaded therein. Lubricant may accordingly be forced through fitting 163, passages 161 and 160, into the bearing by any suitable grease gun or the like.

In Figures 6 and 7 a further preferred embodiment of the speed responsive means of my clutch is illustrated. As casing 101, cover plate 117 and driven plate 131 are substantially the same in structure and function as the corresponding elements employed in the modification illustrated in Figure 4, further description thereof is deemed unnecessary. In this form of the invention, driving plate 134a is formed with a series of concave depressions or recesses 166 in contradistinction to the rectangular recesses shown in the driving plates of Figures 1 and 4, the faces of recesses 166 being preferably finished to a high degree of smoothness to reduce friction insofar as possible. A reaction plate 141a is formed with a peripheral flange 159a providing a cylindrical wall 169 which constitutes a stop face. Reaction plate 141a is provided with a series of apertures 171, preferably of general rectangular shape and of a size slightly smaller than but corresponding substantially in position to recess 166 of plate 134a. Adjacent each aperture 171, a bracket 172 is secured to the face of reaction plate 141'a by riveting, welding or similar method.

Yokes 173 are preferably formed integral with bracket 172 and extend into alignment with apertures 171, and have suitable bearing apertures or recesses provided therein as indicated at 174. Pivot pins 175, and supporting crank arms 176 are mounted to oscillate in bearings 174. One end of cranks 176 have projecting members 177 mounted thereon, members 177 being preferably threaded as at 178 and having nuts 179 secured thereon to retain weights 181 in assembled relation therewith. Weights 181 are formed with apertures 182 to receive members 177 and recesses 183 to receive nuts 179.

The forward ends of cranks 176 are provided with spaced ears having bearing recesses 184 formed therein which are adapted to rotatably support pivoted rollers 185. Rollers 185 are arranged to operate in recesses 166 and contact the face of plate 134a and actuate the latter. Brackets 172 are formed with stops or bosses 186 which cooperate with weights 181 for a purpose to be later described.

When the prime mover or other driving mechanism is operating below the engaging speed of the clutch, the parts of this modified form of clutch mechanism assume the positions shown in Figure 6, with the weights held in their inner positions against stops 186 by springs 147, acting through plate 134a, rollers 185, ears 184, and cranks 176.

As the driving member is accelerated above idling speed, weights 181 pivot outwardly about pins 175 as an axis and cause rollers 185 to act upon plate 134a and separate plates 134a and 141a against the action of springs 147. As the speed of the driving member is further increased, weights 181 cause reaction plate 141a to move to the right and build up pressure in springs 148 and cause the driven member to be brought into synchronism with the driving member in the same general manner as that described in connection with the mechanisms previously described. In this form of my invention however, outward movement of weights 181 causes pressure to build up at a comparatively rapidly increasing rate by reason of the rapid increase in mechanical advantage of the cranks as they approach their fully extended positions. This movement may be compared to that of a toggle joint or wedge. A comparison of the positions of crank 176 in Figures 6 and 7 illustrates that their mechanical advantage is comparatively low when the clutch is disengaged (Figure 6), and assumes a comparatively great value when the clutch is fully engaged (Figure 7) with weights 181 in contact with face 169 of flange 159a.

Although I have illustrated mechanisms which are fully automatic, i. e., they are solely speed responsive and no manual control thereof is provided, it is to be understood that if it is desired, in any particular installation, manually operable declutching mechanism may be connected to the reaction plates of the various mechanisms for causing movement thereof to the right against the action of their reaction springs to bring the driving plates out of engagement with the driven member, and the appended claims are intended to embrace mechanisms of this character. It is also to be understood, that although I have illustrated and prefer to employ clutch mechanisms of the "single plate" type, i. e., clutch mechanisms wherein a pair of driving members frictionally cooperate with a single driven member, my invention comprehends mechanisms of the type wherein three or more driving members cooperate with two or more driven members.

In Figure 8, a clutch embodying the principles of this invention is shown as applied to a railway car; as of the Pullman type, for driving a generator or like unit. A truck 192 is provided with a wheel 193 and axle 194 from which drive is transmitted to a drive shaft 195 through a universal joint 196 by means of a suitable type of drive such as a hypoid, or spiral bevel assembly indicated generally at 197. Since the manner of taking power from the axle of the truck involves no part of the present invention, further description thereof is deemed unnecessary. Power is transmitted by drive shaft 195 to a novel universal joint 198 which is connected to a casing 11 of a clutch of this invention as for instance the clutch shown in Figure 1. Drive for the clutch is taken through a drive shaft 28 which in turn drives unit 31. Unit 31, which may be a generator or other unit, is suitably suspended from a beam of the railway car by hangers 199 in which may be incorporated suitable shock absorbing means, if desired.

In the operation of this assembly, rotation is immediately imparted to clutch housing 11 upon movement of the railway car and consequent rotation of wheels 193. By reason of the speed responsive means associated with the clutch, the driving and driven members remain uncoupled until a predetermined speed of rotation of the clutch housing is reached. When the clutch establishes a driving connection between the driving and driven members, the railway car has attained considerable momentum, and the additional load imposed upon the shaft member by the unit being driven is accordingly practically negligible, and is easily handled.

It is desirable in some cases wherein relatively long trains are involved or the load imposed by the units to be driven is relatively large to stagger the speeds at which different clutches will engage thereby providing a progressive engagement of the different clutches in contradistinction to a simultaneous engagement of all clutches. It is to be noted that the provision of such a clutch as described herein is of marked advantage in reducing wear and tear on the unit being driven when railway cars in a yard are being shifted. With a type of drive that is constantly engaged, the unit is subjected to jolting and jerking with recurring reversals in direction of rotation whereas with the clutch of the present invention, no power whatsoever is transmitted to the unit until the railway car has reached a relatively high steady speed at which time a smooth effective engagement is obtained with no ill effects on the unit.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In an automatic clutch mechanism, in sub-combination, a driving member and a reaction member mounted for relative axial movement away from each other, levers journalled for oscillation in one of said members and adapted to force the said members away from each other when said levers are oscillated; speed responsive means for oscillating said levers when said members attain a predetermined speed; and means projecting from and integral with said reaction member and cooperating with said driving member for holding said levers under stress and tight in their journals when they are not under the influence of said speed responsive means.

2. An automatic clutch mechanism comprising an open-ended casing; a universal joint connected to said casing; a bearing in said casing in alignment with said universal joint and arranged to be lubricated therefrom; a cover for said casing; a bearing in said cover, said cover having a passage therethrough to lubricate said bearing; a driving member and a driven member mounted within said casing for engagement and disengagement; speed-responsive means for effecting engagement and disengagement of said member; means rotatably supported in said bearings to support and be driven by said driven member; and means to prevent the flow of lubricant from said bearings into said casing.

3. An automatic clutch mechanism comprising a rotatable support providing a cylindrical recess; a driving member and a driven member mounted in said recess for engagement and disengagement; a reaction member and speed responsive means associated therewith for causing said engagement and disengagement; said driving and reaction members being generally circular in shape with their outer peripheries extending adjacent to the wall of said recess; a circumferential series of radial openings in said support in alignment with said driving member, a set of splines on the periphery of said driving member, and a set of key elements received by said openings and extending radially into said cylindrical recess beyond the peripheries of said driving and reaction members and into operative engagement with said splines, whereby said key elements operate to form a driving connection between said support and said driving member and provide abutment means for limiting axial movement of said reaction member in one direction.

4. A clutch mechanism comprising a rotatable support providing a cylindrical recess; a reaction member and driving and driven clutch plates carried by said support and positioned in said recess; resilient means carried by said support; centrifugally operable weight levers adapted to apply reaction forces to said reaction member and fulcrumed on one of said plates to effect engagement and disengagement of said plates and cause said reaction member to move in one direction against the action of said resilient means; said reaction member and said driving plate being circular with their peripheries extending adjacent to the wall of said cylindrical recess; a circumferential series of radial openings in said support in alignment with said driving plate; a set of splines in the periphery of said driving plate; and a set of key elements received by said openings and extending radially into said cylindrical recess beyond the peripheries of said driving and reaction members and into operative engagement with said splines, whereby said key elements operate to form a driving connection between said support and said driving member and provide abutment means for limiting axial movement of said reaction member in a direction opposite to said first mentioned direction.

5. An automatic clutch mechanism comprising a rotatable support; a driving member and a driven member mounted for engagement and disengagement; a reaction member axially movable in said support and formed with a plurality of radially extending relatively narrow slots on its periphery; speed responsive means associated with said reaction member for effecting said engagement and disengagement; key means carried by said support and loosely engaging the outer portion of said slots to lock said support and said reaction member against relative rotation; projections carried by said driving member and engaging said slots inwardly of said key means for preventing relative rotation of said driving member with respect to said reaction member; apertured spring seats positioned over said slots and extending on opposite sides thereof; headed studs carried by said driving member and projecting through said apertures, a set of concentric springs abutting each of said seats, one of the springs of each set abutting the headed stud and the other spring of each set abutting said support.

ROBERT P. LEWIS.